United States Patent
Kraska

(10) Patent No.: US 6,203,937 B1
(45) Date of Patent: Mar. 20, 2001

(54) HERMETIC CLOSURE SEAL

(75) Inventor: Robert E. Kraska, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

(21) Appl. No.: 08/263,700

(22) Filed: Jun. 22, 1994

(51) Int. Cl.$^7$ ........................................ H01M 2/08
(52) U.S. Cl. ..................... 429/89; 429/172; 429/180; 429/185; 29/623.2
(58) Field of Search ................... 429/57, 59, 89, 429/171, 172, 180, 181, 185; 220/256, 361, 364, 365; 29/623.2

(56) References Cited

U.S. PATENT DOCUMENTS

| | | | |
|---|---|---|---|
| 4,060,671 | 11/1977 | VanderVelden | 429/174 |
| 4,174,424 | 11/1979 | Jurva | 429/90 |
| 4,215,466 | 8/1980 | Bindin | 29/623.2 |
| 4,252,873 | 2/1981 | Epstein | 429/181 |
| 4,258,739 | 3/1981 | Blankenship | 137/71 |
| 4,294,897 | 10/1981 | Bindin | 429/104 |
| 4,329,405 | 5/1982 | Zupancic | 429/56 |
| 4,437,578 | 3/1984 | Bienak | 220/256 |
| 4,478,788 * | 10/1984 | Rozmus | 419/48 |
| 4,498,601 | 2/1985 | Fort | 220/256 |
| 4,500,009 | 2/1985 | Rozmus | 220/256 |
| 4,542,080 | 9/1985 | Phillips | 429/174 |
| 4,544,078 | 10/1985 | Arenas | 220/256 |
| 4,572,877 | 2/1986 | Botos | 429/53 |
| 4,684,589 | 8/1987 | Van Dyke, Jr. | 429/184 |
| 4,748,094 | 5/1988 | Howard | 429/90 |
| 4,913,986 | 4/1990 | Howard | 429/90 |
| 5,004,656 * | 4/1991 | Sato et al. | 429/162 |
| 5,114,808 * | 5/1992 | Chaney, Jr. et al. | 429/172 |

* cited by examiner

*Primary Examiner*—Stephen Kalafut
(74) *Attorney, Agent, or Firm*—Daniel W. Latham; Harold R. Patton; Girma Wolde-Michael

(57) ABSTRACT

A closed container is filled through a metal fill port which is then sealed with a rigid metal ball press fitted into the port passageway.

5 Claims, 1 Drawing Sheet

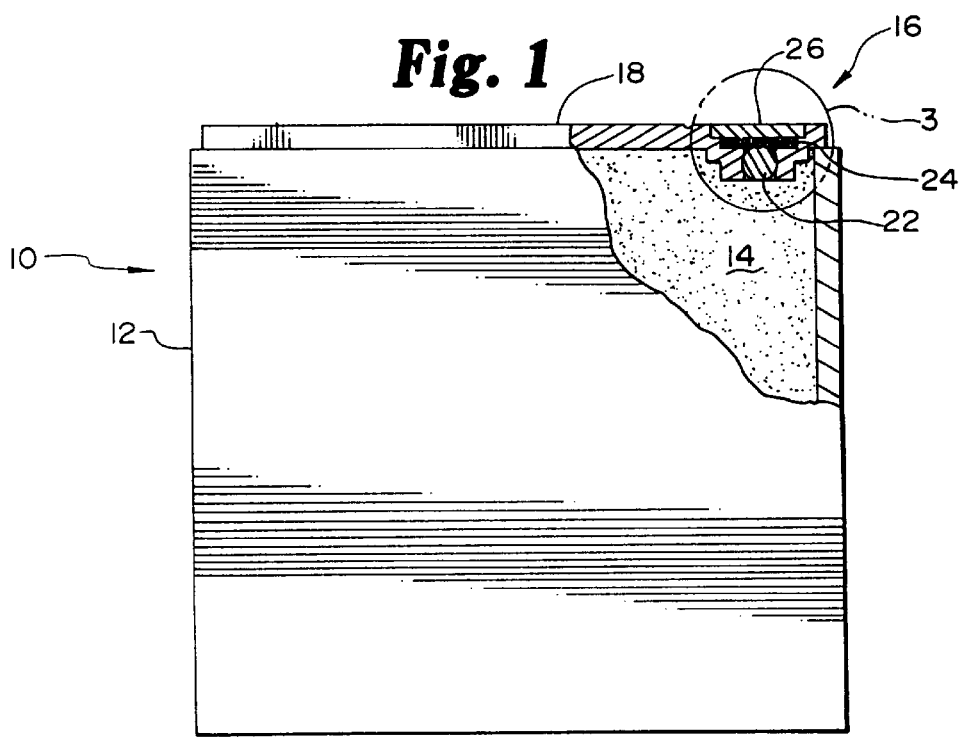
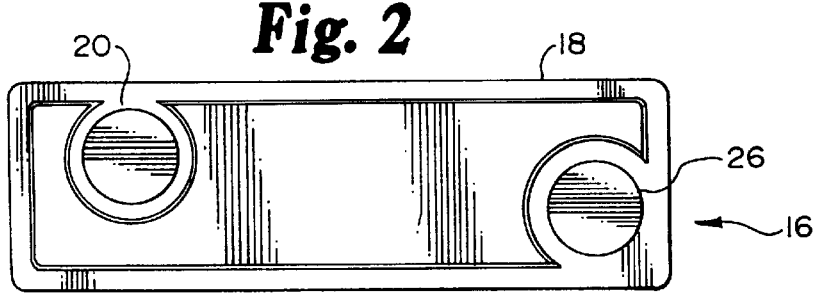
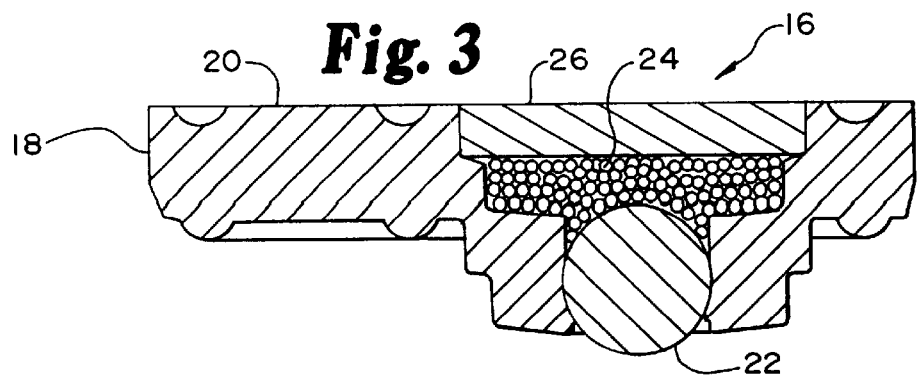

HERMETIC CLOSURE SEAL

BACKGROUND OF THE INVENTION

This invention relates to the filling and sealing of containers having fill ports such as electrolytic cells and specifically batteries. The invention was specifically developed for and has found utility in the filling and hermetically sealing of batteries intended for powering medical devices.

The battery's components are usually encapsulated in a metal container the top of which is closed by a metal header. The header typically has a fill port formed therein which provides a cylindrical passageway through which liquid components are introduced into the container. 304L stainless steel is a typical container and header material although there are many grades of stainless steel which may be used. Following placement of mechanical components and any solid chemical constituents in the container, the header is welded to the container top. The container is then filled with a liquid constituent through the header fill port which is then hermetically sealed. The hermeticity or perfection of seal at the fill port is an important feature in high reliability cells.

SUMMARY OF THE INVENTION

The attainment of a closure seal with a consistent and high level of hermeticity (such as <$1.0 \times 10^{-9}$ cm$^3$ He/sec) in the fill port is facilitated by using a rigid metal ball possessing high hardness (>55$R_c$) and a high yield strength. This ball is press fitted into the fill port passageway. Deformable soft balls do not consistently produce hermetic closure seals; nor will a ball of high strength but of intermediate hardness (about 45$R_c$, for example) such as MP35N alloy. Such a ball is susceptible to galling and can be easily scratched. The resulting hermetic seal between the ball and fill port passageway assures that the solvent components within the container will not leak past the seal and plug leakage paths in the closing button 26 to the header 18 weld joint. Said leakage paths must be free of solvents to allow for the passage of helium from the getter material 24, thereby facilitating the verification that the closing button to leader weld joint meets or exceeds hermetically requirements.

BRIEF DESCRIPTION OF THE FIGURES

FIG. 1 shows a front elevational review of a typical battery with a portion cut away;

FIG. 2 shows a top view of the battery of FIG. 1, looking down on the header.

FIG. 3 is an elongated view of the portion so indicated in FIG. 1.

DETAILED DESCRIPTION OF THE INVENTION

Referring now to the Figures, a battery generally indicated at 10 in FIG. 1 is shown which includes a closure seal arrangement of the invention in its most preferred embodiment. Battery 10 includes a stainless steel container 12 which holds a variety of internal elements (not shown) and a liquid constituent 14, which has been introduced through a fill port passageway, generally indicated at 16, included in a metal header 18. The battery will also include appropriate electrical feedthroughs as at 20 (not specifically shown) as is known in the art.

Fill port seal arrangement 16 includes a hermetic seal by press fit ball 22, as seen best in FIG. 3. Optionally, a getter material 24 and an outer metal cover 26 welded to the fill port may be included. The most preferred getter is hollow glass bubbles available from the 3M Company of St. Paul, Minn. 55101. The bubbles are hollow and absorb test gas (He), holding it within the seal arrangement for later leakage testing procedures. All of the seal arrangement is completed after any liquid constituent has been included through the fill port.

Ball member 22 is a hard rigid metal or other suitable material. A suitable metal ball is an iron base alloy that can be hardened by the martensitic phase transformation reaction, a heat treatment procedure which is well known. An example of said alloy is 440 C martensitic stainless steel (UNS #544004). Transition metal carbides, e.g. tungsten carbide, also possess the high hardness and yield strength required of the ball to afford a hermetic seal. Both of these materials exhibit a hardness (>55 $R_c$) and yield strength which is significantly higher than that of the 304L stainless steel header. The header is preferably annealed although ¼ hard material is also suitable (¼ hard refers to the degree of possible hardening that can be accomplished by cold deformation). The ability of the ball to form a consistent hermetic seal with the cylindrical passageway of the fill port is associated with the high yield strength and abrasive resistance of the ball relative to the material which forms the fill port. Typically, this is the header material per se. For example, as already noted, a preferred header material is 304L. High strength assures that the ball maintains a near spherical geometry when press fit into the metal passageway of the fill port. Hence a high force can be maintained between the ball and passageway wall. This promotes plastic flow of the relatively soft passageway metal thereby creating the seal. The high carbide (the martensitic phase transformation results in a controlled dispersion of Fe and Cr carbides within the matrix of the alloy) content of the hardened ball assures that it retains its smooth surface as it slides past the wall of the passageway thus increasing assurance that the hermetic seal will be formed as the ball is press fit. Preferred finish is about 1–5 micro inches for the ball and about 125 micro inches or less for the passageway. The required force for the press fit may be lowered with the use of a lubricant e.g., retention of battery's electrolyte within the passageway. This reduces the insertion force.

In an example of a preferred embodiment, a 0.0625±0.0002 inch ball (440 C SS ($R_c$: 53–59) is inserted at a low velocity into a passageway of 304L SS having a dimension of 0.060 inch±0.001 diameter. In its final position in the passageway, the center of the ball should be greater than 0.015 from either end of the passageway for most consistent hermetic results. Minimal ball/passageway diametric interference is preferably about 0.00125 inch.

Lastly, corrosion protection of the ball is desired to insure long effective life and is made possible by constructing and arranging the battery design to be "case negative". This means that the container case is allowed to assume the same electrical potential as the anode, the potential also being associated with the fill passage and ball. Such case negative construction and arrangement is known in the art. This is particularly helpful when the ball is tungsten carbide, actually being comprised of a matrix alloy of cobalt/iron carrying tungsten carbide particles therein.

While this invention may be embodied in many different forms, there are described in detail herein specific preferred embodiments of the invention. This description is an exemplification of the principles of the invention and is not intended to limit the invention to the particular embodiments illustrated.

Having described the invention by way of illustration, the exclusive property rights therein are defined by the following claims.

What is claimed is as follows:

1. A battery having a fill port with a hermetic seal, the hermetic seal comprising in combination a container having a cylindrical passageway defined by a wall made from a material selected from the group consisting of ¼ hard stainless steel and annealed stainless steel, a smooth, rigid ball of slightly larger diameter than that of the passageway, the smooth ball having a surface finish of less than about 5 micro inches, the ball having a hardness of greater than about $55R_c$ provided by a material selected from the group consisting of a transition metal carbide and an iron base alloy hardened by martensitic phase transformation, the ball being press fit into the passageway causing the passageway metal to flow about the ball forming a seal therewith.

2. The battery of claim 1 wherein the iron base alloy hardened by martensitic phase transformation is a martensitic stainless steel.

3. The battery of claim 1 wherein the transition metal carbide is tungsten carbide.

4. A method for making a battery comprising the steps of:

providing a stainless steel case;

making a cylindrical passageway of uniform diameter in the case;

annealing the stainless steel of the case at the passageway;

providing a smooth, rigid metal carbide ball having a spherical shape and a uniform diameter greater than the diameter of the circular passageway and a surface having a hardness greater than about $55R_c$, the smooth ball having a surface finish of less than about 5 micro inches;

pressing the metal ball into the passageway causing the passageway metal to flow about the ball and form a seal therewith.

5. The method of claim 4 wherein the ball is provided by the step of heat treating an iron based alloy to provide a martensitic phase transformation.

* * * * *